(12) United States Patent
Oblizajek et al.

(10) Patent No.: US 8,725,354 B2
(45) Date of Patent: May 13, 2014

(54) ELECTRIC POWER STEERING SYSTEMS AND METHODS

(75) Inventors: Kenneth L. Oblizajek, Troy, MI (US); John D. Sopoci, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/476,285

(22) Filed: May 21, 2012

(65) Prior Publication Data

US 2013/0311042 A1    Nov. 21, 2013

(51) Int. Cl.
*B62D 6/08*  (2006.01)
*B62D 5/04*  (2006.01)

(52) U.S. Cl.
USPC .............. 701/41; 180/443; 180/446; 180/447

(58) Field of Classification Search
USPC .............................. 701/41; 180/443, 446, 447
See application file for complete search history.

(56) References Cited

U.S. PATENT DOCUMENTS

2009/0173566 A1*  7/2009  Ogasawara .................. 180/446
2010/0042295 A1*  2/2010  Shibata et al. ................. 701/41

FOREIGN PATENT DOCUMENTS

DE    102008049065 A1    4/2009
DE    102009002704 A1    11/2010

OTHER PUBLICATIONS

German Patent and Trade Mark Office, Office Action for German Patent Application No. 10 2013 208 955.4, mailed Dec. 17, 2013.

* cited by examiner

*Primary Examiner* — Mary Cheung
*Assistant Examiner* — Brian P Sweeney
(74) *Attorney, Agent, or Firm* — Ingrassia Fisher & Lorenz, P.C.

(57) ABSTRACT

An electric power steering system for a vehicle includes a steering mechanism coupling a steering wheel to a steerable element. A first actuator is in communication with a controller and operatively connected to the steering mechanism for assisting movement of the steerable element in response to a first signal from the controller. The system also includes a second actuator in communication with the controller, separate from the first actuator, and operatively connected to the steering mechanism between the first actuator and the steering wheel for superimposing torque in response to a second signal from the controller.

19 Claims, 2 Drawing Sheets

ELECTRIC POWER STEERING SYSTEMS AND METHODS

BACKGROUND OF THE INVENTION

1. Field of the Invention

The subject matter of the invention relates to electric power steering systems and methods for vehicles.

2. Description of the Related Art

Power steering systems for vehicles, such as automobiles, have long been used to assist an operator (i.e., a driver) of the vehicle in turning the wheels of the vehicle. These systems traditionally have utilized hydraulic fluid to assist in movement of a steering rack. Such hydraulic power steering systems frequently utilize a fluid pump. The fluid pump may be connected to the engine of the vehicle with a belt or connected to an electric motor. The fluid pump may constantly provide fluid flow to a torque-dependent restricting orifice bridge and a hydraulic actuator, which provides the steering assist. Due to continuous flow at non-zero pressure in these systems, commonly referred to as open center hydraulic systems, the engine expends energy to operate the fluid pump whenever the engine is running. This is a wasteful use of fuel as power assist of the steering system is not constantly needed.

Modern electric power steering systems 110, as shown in FIG. 1, utilize an electric actuator 132 instead of the hydraulic actuator to provide the assist to the steering column 118 (e.g., column assisted electric systems) or rack 122 (e.g., rack assisted electric systems). An example of a column assisted electric system 110 is illustrated in FIG. 1, and includes the steering column 118 and rack 122 coupling a steering wheel 112 to vehicle wheels 114. The electric actuator 132 is operatively connected to the steering column 118 to provide the assist. Accordingly, no constantly running hydraulic fluid pump is needed, and assist is provided only as demanded. As a result, energy is conserved and fuel efficiency of the vehicle is increased.

Unfortunately, electric power steering systems often suffer from driver perception issues. For instance, the amount of effort exerted by the driver may not psychophysically coincide with the actual turning of the wheels of the vehicle and the expectations for resisting effort or perceived vehicle responsiveness. As such, the steering may feel "too loose", "too rigid", "sluggish", too high in required effort, and/or too low in required effort to the driver. The relationship between road wheel movement and effort by the operator of the vehicle in such prior art systems is illustrated in FIG. 2.

Accordingly, it is desirable to provide an electric power steering system that achieves better correlation between driver effort, vehicle response, and expectations for effort and response based on subjective impressions of performance. Furthermore, other desirable features and characteristics of the present invention will become apparent from the subsequent detailed description of the invention and the appended claims, taken in conjunction with the accompanying drawings and this background of the invention.

BRIEF SUMMARY

An electric power steering system is provided for a vehicle having a steering wheel and at least one steerable element. The system includes a controller for receiving at least one input related to the vehicle. A steering mechanism is operatively connected to the steering wheel and the at least one steerable element. The steering mechanism allows movement of the at least one steerable element in response to rotation of the steering wheel by a user of the vehicle. A first actuator is in communication with the controller and operatively connected to the steering mechanism for assisting movement of the steerable element in response to a first signal from the controller. The system also includes a second actuator in communication with the controller, separate from the first actuator, and operatively connected to the steering mechanism between the first actuator and the steering wheel for applying torque in response to a second signal from the controller.

A method of providing power steering to a vehicle is also described. The vehicle includes a steering wheel, at least one steerable element, and a steering mechanism. The steering mechanism operatively connects the steering wheel and the at least one steerable element for allowing movement of the at least one steerable element in response to rotation of the steering wheel by a user of the vehicle. The method includes receiving inputs related to the vehicle at a controller. The method further includes assisting rotation of the steerable element with a first actuator in response to a first signal received at the first actuator from the controller. The method also includes applying torque with a second actuator, separate from the first actuator, in response to a second signal received at the second actuator from the controller.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Referring to the figures, wherein like numerals indicate like parts throughout the several views, an electric power steering ("EPS") system 310 is shown and described herein.

Figure 1:
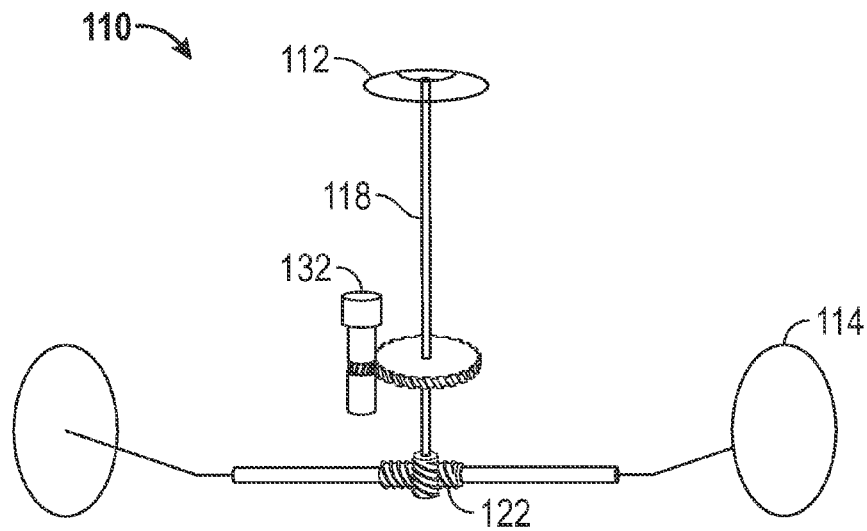
FIG. 1 is a simplified representation of an electric power steering system according to the prior art.
Figure 2:
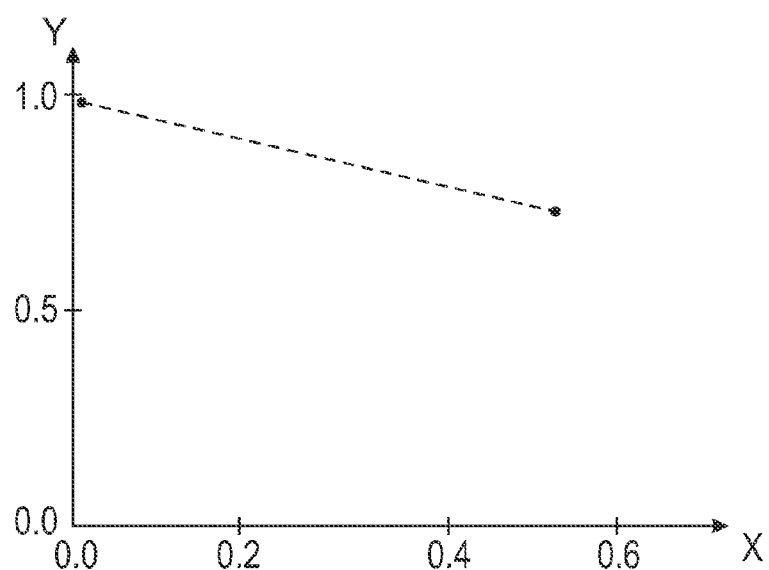
FIG. 2 is a graph showing the relationship between road wheel dynamic movement and driver instantaneous effort in the electric power steering system according to the prior art.
Figure 3:
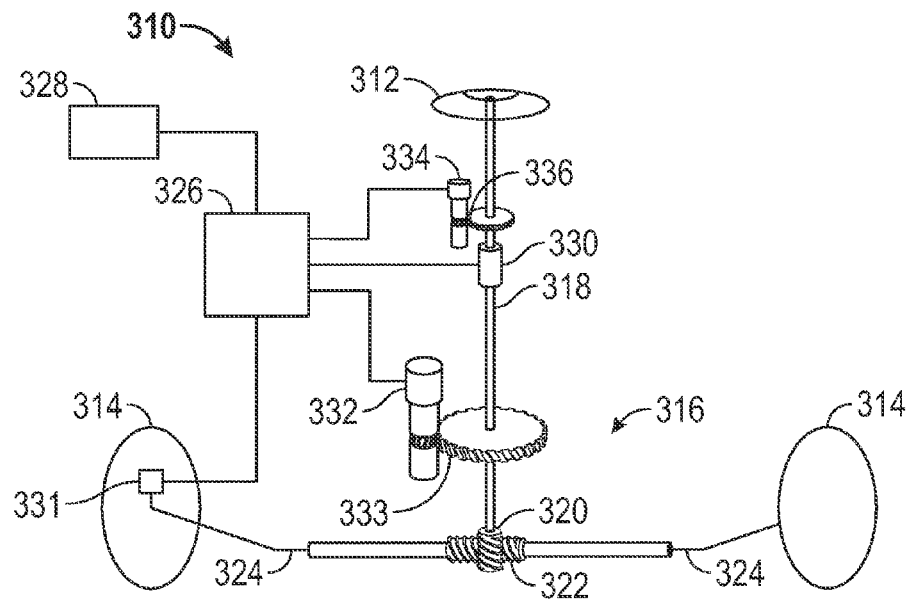
FIG. 3 is a simplified representation of a first embodiment of an electric power steering system according to the disclosure herein.
Figure 4:
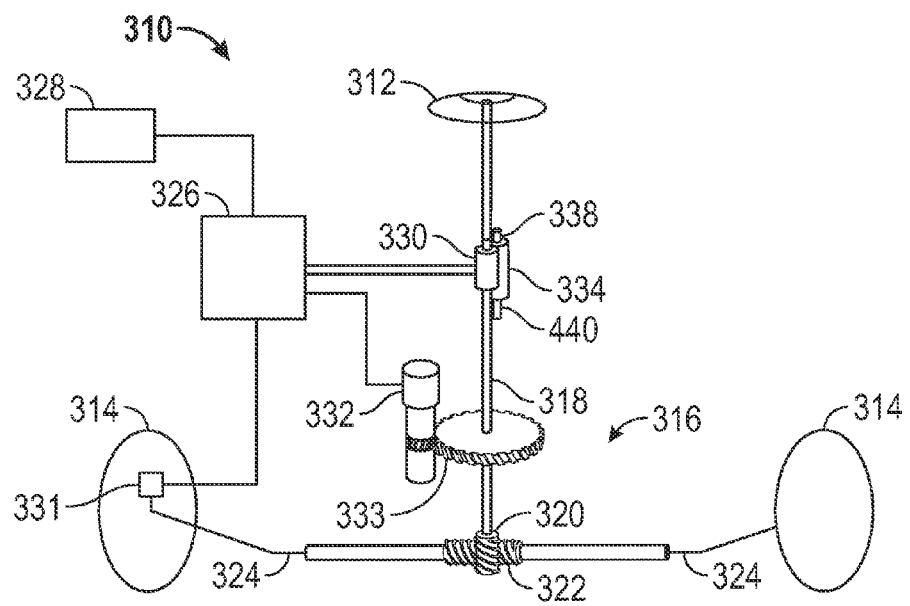
FIG. 4 is a simplified representation of a second embodiment of an electric power steering system according to the disclosure herein.

Referring to FIG. 3 or 4, the system 310 is operable with a vehicle (not shown) having a steering wheel 312 and at least one steerable element 314. In the illustrated embodiments, the vehicle is an automobile (not shown) where the steerable elements 314 are two wheels. However, in another embodiment, the vehicle could be a boat (not shown) where the steerable element 314 is a rudder. In yet another embodiment, the vehicle could be an airplane (not shown), where the steerable element 314 is a flight control surface, e.g., a rudder, aileron, or other surface. In such an embodiment, a "steering wheel" may be considered to be the yoke of the airplane. For purposes of readability, the at least one steerable element 314 will be referred to hereafter simply as "the steerable element 314".

The system 310 includes a steering mechanism 316. The steering mechanism 316 is configured to operatively connect the steering wheel 312 and the steerable element 314 to allow movement of the steerable element 314 in response to rotation of the steering wheel 312 by a user of the vehicle. In the illustrated embodiments, the steering mechanism 316 includes a steering column 318. The steering column 318 extends between proximal and distal ends (not numbered). The proximal end is coupled to the steering wheel 312, such that the steering column 318 is rotatable in response to rotation of the steering wheel 312. A pinion 320 is coupled to the distal end of steering column 318. The pinion 320 includes a plurality of teeth (not numbered). The pinion 320 is rotatable in response to rotation of the steering column 318 and, accordingly, rotatable in response to rotation of the steering wheel 312.

Also in the illustrated embodiments, the steering mechanism 316 includes a rack 322. The rack 322 includes a plurality of teeth (not numbered) which engage the teeth of the pinion 320. As such, the rack 322 moves in response to rotation of the pinion 320. The rack 322 is operatively connected to the steerable element 314. Specifically, in the illustrated embodiment, the rack 322 is coupled to a pair of tie rods 324 and each tie rod 324 is coupled to one of the steerable elements 314, e.g., one of the wheels. Accordingly, the steerable elements 314 of the vehicle may be turned in response to a rotation of the steering wheel 312.

The system 310 includes a controller 326. The controller 326 influences operation of the system 310. The controller 326 may be implemented with a microprocessor, microcontroller, application specific integrated circuit ("ASIC"), or other computing device for receiving inputs and/or data, performing calculations, and providing control signals to control various devices. However, the controller 326 may be implemented with non-computing devices, e.g., analog circuits and/or relays. The controller 326 includes at least one input (not shown) to receive data, signals, and/or information related to the vehicle.

The system 310 may include a vehicle speed sensor 328 for sensing the speed of the vehicle. There are numerous techniques for sensing the speed of the vehicle, e.g., sensing the rotational speed of a wheel of the vehicle. The vehicle speed sensor 328 also provides data corresponding to the speed of the vehicle. This data may be encoded in a vehicle speed signal. The vehicle speed sensor 328 is in communication with the controller 326, which receives the vehicle speed signal produced by the vehicle speed sensor 328. The vehicle speed signal may be an analog signal where an electrical characteristic of the signal relates to the speed of the vehicle. Alternately, the vehicle speed signal may be a digital signal which, for example, is communicated over a vehicle communications bus (not shown).

The system 310 of the illustrated embodiments also includes a torque sensor 330 operatively connected to the steering mechanism 316 for measuring an amount of torque existing in the steering column 318. In the illustrated embodiments, the torque sensor 330 is connected in-line with the steering column 318. As such, the torque sensor 330 is disposed between the steering wheel 312 and the pinion 320. The torque sensor 330 may be implemented with a torsion bar (not shown) and at least one sensing element (not shown), hereinafter referred to simply as "the sensing element". The sensing element senses the amount of twist in the torsion bar. The sensing element may be implemented as a pair of rotary encoders (not shown). Of course, other techniques may be utilized to implement the torque sensor 330, as will be realized by those skilled in the art, based on the description herein.

The torque sensor 330 also provides data corresponding to the amount of torque sensed. This data may be encoded as a torque signal and may be an analog and/or a digital signal. The torque sensor 330 of the illustrated embodiments is in communication with the controller 326 and transmits the amount of torque, as measured, to the controller 326.

The system 310 may also include one or more angular position sensors 331 for sensing angular positions of the steering wheel 312 and/or steerable element 314. In the illustrated embodiment, the data provided by the angular position sensor 331 reflects the amount of rotation of the steerable element 314 (e.g., the wheels of the vehicle) from a straight forward travel position. Actual implementations of these position sensors 331 typically sense rack 322 or pinion 320 motion. Such implementations involve integrating the sensor 331 within the rack 322, proceeding from the rack 322 to the steering wheel 312, and/or at intermediate connection elements until a relatively compliant member limits the ability to adequately define purely kinematic relationships. These implementations constitute established practices, as realized by those skilled in the art.

The system 310 further includes a first actuator 332. The first actuator 332 is operatively connected to the steering mechanism 316. The operative connection between the first actuator 332 and the steering mechanism 316 may be achieved, at least in part, with gears 333. In the illustrated embodiments, the torque sensor 330 is disposed along the steering column 318 between the first actuator 332 and the steering wheel 312. Said another way, the torque sensor 330 is disposed downstream from the steering wheel 312 and the first actuator 332 is disposed downstream from the torque sensor 330.

In the illustrated embodiments, the first actuator 332 is operatively connected to the steering column 318. This configuration may be referred to as "column-mounted electric power steering". In other embodiments (not shown), the first actuator 332 is operatively connected to the rack 322. This configuration may be referred to as "rack-mounted electric power steering".

Due to the operative connection of the first actuator 332 to the steering mechanism 316, and the operative connection of the steering mechanism 316 to the steerable element 314, the first actuator 332 may also aid movement of the steerable element 314. More specifically, the first actuator 332 may provide assistance, or simply "assist", to the operator in attempting to move the steerable element 314.

The first actuator 332 in the illustrated embodiments includes an electric motor (not separately numbered) for providing a controlled amount of torque to the steering mechanism 316. Actuation of the first actuator 332 is done in response to a first signal. The first actuator 332 is in communication with the controller 326. The first signal is generated by the controller 326 and received by the first actuator 332. Determination of the characteristics of the first signal is described in greater detail below.

The system 310 also includes a second actuator 334. The second actuator 334 is operatively connected to the steering mechanism 316 and is separate from the first actuator 332. As such, the second actuator 334 applies torque separately from the torque produced by the first actuator 332. In the illustrated embodiments, the second actuator 334 is disposed between the torque sensor 330 and the steering wheel 312 along the steering column 318.

Due to the operative connection of the second actuator 332 to the steering mechanism 316, the second actuator 334 may also apply torque at a single attachment point to the column 318, as depicted in FIG. 3, or apply an amount of differential torque with dual attachment points, as depicted in FIG. 4. Analogous configurations are also possible for the rack mounted electronic power systems with attachments upstream and downstream of the torque sensor, typically mounted at the input shaft of the rack assembly. More specifically, the second actuator 334 may modulate assistance to the operator attempting to move the steerable element 314. For example, at times and dependent on state, the second actuator 334 may provide modest levels of resistance to the turning of the steering mechanism 316 by providing torque to the steering mechanism 316 in an opposite direction to the torque being provided by the operator. In turn, and at other times, the second actuator 334 may provide modest levels of increased assistance.

The second actuator 334 in the illustrated embodiments includes an electric motor (not separately numbered) for providing a controlled amount of torque to the steering mechanism 316. Actuation of the second actuator 334 is done in response to a second signal. Furthermore, the amount, or level, of torque applied by the second actuator 334 is done responsive to the characteristics of the second signal. The second actuator 334 is in communication with the controller 3326. The second signal is generated by the controller 326 and received by the second actuator 334. Determination of the characteristics of the second signal is described in greater detail below.

In a first embodiment, as shown in FIG. 3, the second actuator 334 is operatively connected between the torque sensor 330 and the steering wheel 312. Said another way, the second actuator 334 is disposed downstream from the steering wheel 312 and upstream from the torque sensor 330. Gears 336 may be implemented to achieve the operative connection between the second actuator 334 and the steering mechanism 316.

In a second embodiment, as shown in FIG. 4, the second actuator 334 is operatively connected to the steering mechanism 316 both upstream and downstream of the torque sensor 330. Said another way, the second actuator 334 is disposed across the torque sensor 330. Said yet another way, the second actuator 334 is disposed in parallel with the torque sensor 330.

Specifically, the operative connection of the second actuator 334 to the steering mechanism 316 may be performed with a first set of gears 338 and a second set of gears 440. The first set of gears 338 couple the second actuator 334 to the steering mechanism 316 at one side of the torque sensor 330 while the second set of gears 440 couple second actuator 334 to the steering mechanism 316 at the other side of the torque sensor 330. However, the second actuator 334 may be integral with the torque sensor 330, and thus not require gearing. Such an integral configuration does not significantly add stiction or friction to the system 310.

In embodiments incorporating the second actuator 334, the torque signal provided by the torque sensor 330 will reflect both the torque applied by the operator and the torque applied by the second actuator 334. As such, the controller 326 may subtract out the torque applied by the second actuator 334 from the measured torque to determine the actual torque applied by the operator.

The controller 326 of the illustrated embodiments includes computational functionality to calculate the amount of torque to be applied to the steering mechanism 316 by the first actuator 332 and the second actuator 334. This calculation may take into account any of the inputs related to the vehicle that are received by the controller 326. For example, the calculation of the amount of torque to be applied by the actuators 332, 334 may be responsive to the vehicle speed sensed by the vehicle speed sensor 328, the torque sensed by the torque sensor 330, the angular position of the steerable element 314 by the angular position sensor 331, the angular position of the steering wheel 312, and/or derivatives and integrals thereof. Conditional torque application is also possible depending on the measured motions, torques, derived signals, and combinations thereof.

In the illustrated embodiments, the following transfer function may be utilized computing the amount of torque to be applied by the actuators 332, 334:

$$\begin{bmatrix} SWT \\ \theta_{RW} \end{bmatrix} = \begin{bmatrix} H_{11} & H_{12} \\ H_{21} & H_{22} \end{bmatrix} \begin{bmatrix} T_1 \\ T_2 \end{bmatrix},$$

where $T_1$ is the torque to be applied by the first actuator 332; $T_2$ is the torque to be applied by the second actuator 334, SWT is the torque applied by the driver, as measured by the torque sensor 330; $\theta_{RW}$ is the angle of the road wheels, i.e., the steerable element 314; and $H_{11}$, $H_{312}$, $H_{21}$, and $H_{3322}$ are transfer functions. Furthermore, in the illustrated embodiments, the torque to be applied by the first and second actuators 332, 334 is encoded in the first and second signals, and transmitted from the controller 326 to the first and second actuators 332, 334, respectively. Said another way, first and second signals are generated by the controller 326 that correspond to the amount of torque to be applied by the first and second actuators 332, 334.

The system 310 and method described herein can provide a greater relationship between steerable element 314 (e.g., road wheel) dynamic movement and operator effort. As such, the system 310 and method can provide better correlation between perceived driver effort and vehicle response.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. An electric power steering system for a vehicle having a steering wheel and at least one steerable element, said system comprising:
   a controller for receiving at least one input related to the vehicle;
   a steering mechanism operatively connecting the steering wheel and the at least one steerable element for allowing movement of the at least one steerable element in response to rotation of the steering wheel by an operator of the vehicle;
   a first actuator in communication with said controller and operatively connected to said steering mechanism for assisting movement of the steerable element in response to a first signal from said controller; and
   a second actuator in communication with said controller, separate from said first actuator, and operatively connected to said steering mechanism for applying torque in response to a second signal from said controller;
   wherein said second actuator is disposed between said first actuator and the steering wheel.

2. A system as set forth in claim 1 further comprising a torque sensor operatively connected to said steering mechanism and in communication with said controller for measuring an amount of torque at said steering mechanism and transmitting a torque signal indicating the amount of torque at said steering mechanism.

3. A system as set forth in claim 2 wherein said second actuator is operatively connected to said steering mechanism both upstream and downstream of said torque sensor.

4. A system as set forth in claim 2 wherein said second actuator is operatively connected between said torque sensor and the steering wheel.

5. A system as set forth in claim 2 wherein said torque sensor is disposed between said first actuator and the steering wheel.

6. A system as set forth in claim 1 wherein said steering mechanism comprises:
  a steering column rotatable in response to rotation of the steering wheel;
  a pinion coupled to said steering column and rotatable in response to rotation of the steering column; and
  a rack operatively connected to the at least one steerable element and engaging said pinion to actuate the at least one steerable element in response to the rotation of the pinion.

7. A system as set forth in claim 6 wherein said first actuator is operatively connected to said steering column.

8. A system as set forth in claim 6 wherein said first actuator is operatively connected to said rack.

9. A system as set forth in claim 6 further comprising a torque sensor connected in-line with said steering column and in communication with said controller for measuring an amount of torque at said steering column and transmitting a torque signal indicating the amount of torque at said steering column.

10. A system as set forth in claim 9 wherein said second actuator is operatively connected to said steering column both upstream and downstream of said torque sensor.

11. A system as set forth in claim 1 further comprising a vehicle speed sensor for sensing a speed of the vehicle and providing a vehicle speed signal corresponding to the speed of the vehicle to said controller.

12. A system as set forth in claim 1 further comprising an angular position sensor for sensing an angular position of at least one of the steering wheel and the at least one steerable element and providing a signal corresponding to the angular position to said controller.

13. A method of providing power steering to a vehicle having a steering wheel, at least one steerable element, and a steering mechanism operatively connecting the steering wheel and the at least one steerable element for allowing movement of the at least one steerable element in response to rotation of the steering wheel by a user of the vehicle, said method comprising:
  receiving inputs related to the vehicle at a controller;
  assisting rotation of the steerable element with a first actuator in response to a first signal received at the first actuator from the controller; and
  applying torque with a second actuator to the steering column between the first actuator and the steering wheel in response to a second signal received at the second actuator from the controller.

14. A method as set forth in claim 13 further comprising the steps of measuring an amount of torque applied at the steering mechanism and wherein said step of receiving inputs related to the vehicle at the controller comprises receiving a torque signal indicating the amount of torque applied at the steering mechanism.

15. A method as set forth in claim 14 further comprising:
  calculating a first torque at the controller to be applied by the first actuator; and
  calculating a second torque at the controller to be applied by the second actuator.

16. A method as set forth in claim 15 further comprising:
  generating the first signal at the controller corresponding to the first torque to be applied; and
  generating the second signal at the controller corresponding to the second torque to be applied.

17. A method as set forth in claim 16 further comprising determining an angular position of at least one of the steering wheel and the at least one steerable element, and wherein said step of receiving inputs related to the vehicle at the controller comprises receiving a signal indicating the angular position at the controller.

18. A method as set forth in claim 17 wherein calculating a first torque to be applied by the first actuator comprises calculating a first torque to be applied by the first actuator based at least on the amount of torque applied by the operator and the angular position.

19. An electric power steering system for a vehicle having a steering wheel and at least one steerable element, said system comprising:
  a controller for receiving at least one input related to the vehicle;
  a steering mechanism operatively connecting the steering wheel and the at least one steerable element for allowing movement of the at least one steerable element in response to rotation of the steering wheel by an operator of the vehicle;
  a first actuator in communication with said controller and operatively connected to said steering mechanism for assisting movement of the steerable element in response to a first signal from said controller;
  a second actuator in communication with said controller, separate from said first actuator, and operatively connected to said steering mechanism for applying torque in response to a second signal from said controller; and
  a torque sensor operatively connected to said steering mechanism and in communication with said controller for measuring an amount of torque at said steering mechanism and transmitting a torque signal indicating the amount of torque at said steering mechanism;
  wherein said second actuator is operatively connected to said steering mechanism both upstream and downstream of said torque sensor.

* * * * *